3,423,377
LOW FRICTION ELASTOMERS
Gerald J. Tennenhouse, Oak Park, Mich., assignor to General Motors Corporation, Detroit, Mich., a corporation of Delaware
No Drawing. Filed May 6, 1966, Ser. No. 548,054
U.S. Cl. 260—80.7                     6 Claims
Int. Cl. C08d 13/26; C08c 17/24

This invention relates to natural and synthetic resin elastomers having a low coefficient of friction and to a process for modifying the surface of the elastomers whereby the coefficient of friction of their surfaces is greatly reduced.

As is well known, various natural and synthetic elastomers such as natural rubber, synthetic polyisoprenes, polybutadienes, butadiene-styrene copolymers, butadiene-acrylonitrile copolymers, butadiene-styrene-acrylonitrile copolymers, polychloroprene and the like, are valued highly in a variety of applications because of their properties of high elasticity and high coefficient of friction.

In some applications, as for example, inner tubes, rubber bands and balloons, the rubber is used for its high elasticity. In other applications, as for example, rubber tires and floor treads, the rubber is used both for its elasticity and high coefficient of friction. In still other applications, however, the property of elasticity is highly important and the high frictional property is undesirable and is merely tolerated to take advantage of elastic property of the rubber. Applications falling in the latter category include fluid seals in which the seal serves a wiping function against a relatively movable part, e.g. transmission seals, etc. In this category of applications the high frictional property of the rubber may be greatly disadvantageous since it results in a high wear rate of the article and accordingly a relatively short life.

It is accordingly the basic object of this invention to provide a rubber product taken from the group consisting of natural rubber, synthetic polyisoprene, polybutadiene, butadiene-styrene copolymers, butadiene-acrylonitrile copolymers, butadiene - styrene - acrylonitrile copolymers, polychloroprene and similar rubber products of 1,3-diene monomers having a markedly reduced coefficient of friction.

It is a further object of this invention to provide a process whereby the surface of the rubber article is directly treated and the surface structure thereof is modified whereby the coefficient of friction of the rubber surface is greatly reduced without alternating the essential elastic properties of the rubber article.

These and other objects of the invention are carried out by subjecting elastomeric compounds, principally of the butadiene-type molecules and including primarily natural rubber, synthetic polyisoprene, polybutadiene, butadiene-acrylonitrile copolymers, butadiene-styrene-acrylonitrile copolymers, butadiene-styrene copolymers and polychloroprene, to boron trifluoride at a temperature range of from about −30° C. to the thermal degradation temperature of the rubber article for a time range from about 15 minutes to about 24 hours.

Other objects and advantages of the invention will be apparent from the following detailed description thereof.

It is known that a polymeric material which contains a hydroxyl group, such as cotton, wood, and cellulose, may be treated with sulfur tetrafluoride to render the material less susceptible to swelling when in contact with water. Also in the past, attempts have been made to reduce the coefficient of friction of elastomers such as natural rubber, butadiene-styrene copolymers, butadiene-acrylonitrile copolymers and polychloroprene by procedures which involve first altering the surface of the elastomer by grafting a polymeric material having reactive groups such as acrylates onto the rubber surface and then subjecting the grafted acrylic surface to sulfur tetrafluoride. This invention, however, involves the surprising discovery that the coefficient of friction of elastomers of the butadiene type, including natural rubber, synthetic polyisoprene, polybutadiene, butadiene-styrene copolymers and the various butadiene-acrylonitrile copolymers and polychloroprene, may have their surfaces suitably cleaned and directly subjected to boron trifluoride whereby the coefficient of friction of the treated elastomer surfaces are substantially reduced without significantly affecting their elasticity or other properties thereof. No grafting or other chemical pretreatment is required.

In general, the process of this invention involves subjecting clean surfaces of an elastomer of the class comprising natural rubber, synthetic polyisoprene, polybutadiene, butadiene-styrene copolymers, butadiene-acrylonitrile copolymers, butadiene - styrene - acrylonitrile copolymers and polychloroprene to boron trifluoride. If the elastomer surface is clean no treatment preliminary to subjecting the surface to boron trifluoride is necessary. In general, suitably clean elastomer surfaces may be obtained by merely washing the elastomer surface with a hot aqueous detergent, rinsing and drying. The dry elastomer is then placed in a suitable reaction vessel, such as one made of stainless steel, and the reaction vessel is charged with boron trifluoride. A surface having a markedly reduced coefficient of friction is obtained within about 15 minutes to 24 hours while the elastomer is maintained at a temperature range from about −30° C. to the thermal degradation temperature of the elastomer. Preferably the boron trifluoride is employed in the form of a gas. Although the charging pressure may be low, in the neighborhood of atmospheric pressure, the reaction time is shortened by charging the reaction vessel with boron trifluoride under pressure in the neighborhood of 25–50 lbs. p.s.i. gauge. Although satisfactory results are obtained in employing the process at room temperature and at subzero degrees down to about −30° C. in some instances, the reaction time may also be reduced by employing elevated temperatures up to the thermal degradation temperature of the elastomer. Temperatures below −30° C. are not favored since the treatment tends to produce a brittle elastomer and, of course, temperatures within the elastomeric thermal degradation range are unsatisfactory because of the adverse affect on the elastomer. In my U.S. Patent No. 3,345,348 it is disclosed that sulfur tetrafluoride may be used to reduce the coefficient of friction of certain elastomers. However, when sulfur tetrafluoride is used to treat the nitrile-type elastomers, a pretreatment is preferred wherein the elastomer surface is exposed to a boiling aqueous potassium hydroxide solution. However, I have found that in using boron trifluoride, no pretreatment of nitrile rubbers is necessary.

The following examples further illustrate the invention.

Example I

A sample of pure nitrile rubber (butadiene-acrylonitrile copolymer containing about 33–35% acrylonitrile) containing no additives was treated in the following manner:

The sample was washed in hot detergent and dried at 60° C. The sample was then placed in a stainless steel reaction vessel and heated at 55° C. at an absolute pressure of about 1 millimeter Hg for 30 minutes. The vessel was then charged with boron trifluoride to a gauge pressure of 25 p.s.i. and heated at 55° C. for 30 minutes. The vessel was then placed under vacuum for 30 minutes after which time the sample was removed and rinsed with acetone. The clear polymer had darkened slightly but was still transparent, soft, and flexible. However, it was very smooth and slippery to the touch. The change in coefficient of friction was then measured.

Samples 1″ x 1″ x 1/16″ of treated and untreated nitrile elastomers were mounted onto a 1″ square block of steel weighing 50 grams. The block was attached to an Instron machine which pulled the weighted sample across a polished stainless steel surface at a constant speed of 20″ per minute. The force required to pull the samples was continuously recorded.

It was found that 140–160 grams force was required to pull the untreated sample. Thus, the untreated sample had a coefficient of friction of 2.8 to 3.2 relative to the stainless steel surface. In contrast, the average force required to move the treated sample at the same uniform rate was 20–22 grams. The coefficient of friction of this sample relative to the stainless steel surface was thus 0.40–0.44.

*Example II*

A rubber having the following composition was treated under the same conditions and tested in the same manner as described in Example I.

| Component: | Parts by weight |
|---|---|
| Butadiene-styrene-acrylonitrile copolymer containing 33–35% acrylonitrile | 100 |
| Zinc oxide | 5 |
| Carbon | 30 |
| Stearic acid | 1 |
| Dibenzyl sebacate | 20 |
| High molecular weight polyester | 25 |
| Sulfur | 0.5 |

The force required to pull the untreated sample at a uniform speed of 20″ per minute across the stainless steel surface was 45 grams whereas the force required to pull the treated sample was 22–25 grams. The coefficient of friction relative to the stainless steel surface was thus found to be 0.44–0.50 for the treated sample and 0.90 for the untreated sample.

Example III

A rubber sample having the following composition was treated and tested in the same manner as described in Example I.

| Component: | Parts by weight |
|---|---|
| Butadiene-styrene-copolymer 23–25% styrene | 100 |
| Triethanolamine | 3 |
| Zinc oxide | 3 |
| Benzothiazyl disulfide | 1.5 |
| Stearic acid | 1.5 |
| Triphenyl-β-naphthylamine | 2 |
| Tetramethyl thiuram disulfide | 1 |
| Sulfur | 0.5 |

In this example the block mounted with the untreated sample required 100 grams force to be pulled across the stainless steel surface at a rate of 20″ per minute. The coefficient of friction was thus determined to be 2.0. The treated sample required 12 grams force, the coefficient of friction being 0.24 relative to the stainless steel surface.

Example IV

A rubber sample having the following composition was treated and tested in the same manner as described in Example I.

| Component: | Parts by weight |
|---|---|
| Natural rubber | 100 |
| Stearic acid | 3 |
| Zinc oxide | 3 |
| Aldol-α-naphthylamine | 1 |
| High molecular weight sulfonic acid | 2 |
| Pine tar | 1 |
| Carbon | 63 |
| 2-mercaptothiazole | 1 |
| Sulfur | 3 |

Seventy (70) grams force was required to pull the block mounted with the untreated sample whereas only 12 grams force was required to pull the block mounted with the treated sample. The coefficients of friction of the untreated and boron trifluoride treated materials relative to the stainless steel surface were calculated to be 1.4 and 0.24 respectively.

Example V

A rubber sample of the following composition was formulated and washed with detergent in the manner described in Example I.

| Component: | Parts by weight |
|---|---|
| Butadiene-acrylonitrile copolymer 40% acrylonitrile | 100 |
| Zinc oxide | 5 |
| Stearic acid | 1 |
| Sulfur | 0.3 |
| Semireinforcing furnace black | 60 |
| High molecular weight polyester of sebacic acid and 1,2-propylene glycol | 10 |
| Tetramethyl thiuram disulfide | 3 |

Different samples of this material were subjected to gaseous boron trifluoride under three varying sets of conditions.

Treatment A.—A sample was sealed in a stainless steel reactor and the reactor charged with boron trifluoride under a pressure of 50 lbs. p.s.i. gauge. The reactor was maintained at 30° C. for 15 minutes. The boron trifluoride was evacuated from the reactor and the samples removed and rinsed with acetone as described above in Example I.

Treatment B.—A second sample was placed in a stainless steel reactor and boron trifluoride charged to the reactor under pressure of 15 lbs. p.s.i. gauge. The contents of the reactor were maintained at 8° C. for a period of 1 hour. The boron trifluoride was then evacuated from the reactor and the sample removed and rinsed with acetone as described above.

Treatment C.—A third sample was placed in a stainless steel reactor and boron trifluoride charged under pressure of 7 lbs. p.s.i. absolute. The contents of the reactor were maintained at 80° C. for 20 minutes. Following this treatment the boron trifluoride was evacuated from the reactor and the sample rinsed with acetone as above.

Samples of the untreated elastomeric composition as well as samples of material which had been exposed to the above three treatments were affixed to steel blocks and the coefficient of friction of each relative to a polished stainless steel surface was determined as described in Example I. The coefficient of friction of the untreated material relative to the stainless steel surface was found to be 0.93. The coefficient of friction of the sample which had been subjected to Treatment A was found to be 0.40. The coefficient of friction of the specimen which had been subjected to Treatment B was found to be 0.54 and that of the elastomer which had been exposed to Treatment C was found to be 0.71.

Example VI

The following materials were compounded into an elastomeric formulation and subjected to treatment with boron trifluoride under the same three varying sets of conditions as described in Example V.

| Component: | Parts by weight |
|---|---|
| Stereospecific polybutadiene—32–35% cis - 1,4-polybutadiene, 55–58% trans - 1,4 - polybutadiene, 7.5% vinyl material | 100 |
| Zinc oxide | 3 |
| Stearic acid | 2 |
| High abrasion furnace black | 35 |
| Sulfur | 2 |
| Aromatic hydrocarbon | 5 |
| N-cyclohexyl-2-benzothiazole sulfenamide | 1.2 |

Samples of untreated and treated materials were fixed to steel blocks and the coefficient of friction determined as described above. The coefficient of friction of the untreated sample relative to the stainless steel surface was found to be 1.16. The coefficient of friction of treated material which had been exposed to the gaseous boron trifluoride as in Treatment A was 0.44. The coefficient of friction of the sample exposed as in Treatment B was 0.36. The coefficient of friction of the sample exposed to boron trifluoride as in Treatment C was 0.45.

Example VII

The following materials were compounded into an elastomeric formulation and subjected to treatment with boron trifluoride under the same three varying sets of conditions as described in Example V.

| Component: | Parts by weight |
|---|---|
| Cis-1,4-polyisoprene 91% cis-1,4-structure | 100 |
| Zinc oxide | 3 |
| Stearic acid | 2 |
| High abrasion furnace black | 35 |
| Sulfur | 2 |
| N-oxydiethylene benzothiazole-2-sulfenamide | 0.8 |

Samples of treated and untreated elastomers were affixed to steel blocks and their respective coefficients of friction determined relative to the stainless steel surface. The coefficient of friction of the untreated specimen was found to be 1.69. The coefficient of friction of the material exposed to boron trifluoride under the conditions of Treatment A was determined to be 0.36. The coefficient of friction of the elastomer exposed to boron trifluoride in accordance with the conditions of Treatments B and C were found to be 0.40 and 0.53 respectively.

Example VIII

The following materials were compounded into an elastomeric formulation and subjected to treatment with boron trifluoride under the same three varying sets of conditions as described in Example V.

| Components: | Parts by weight |
|---|---|
| Polychloroprene | 100 |
| Phenyl-α-naphthylamine | 2 |
| Magnesium oxide | 2 |
| Stearic acid | 0.5 |
| Semireinforcing furnace black | 5 |
| Zinc oxide | 5 |
| 2-mercaptoimidazoline | 1 |

Samples of treated and untreated elastomers were prepared for determination of their respective coefficients of friction as described above. The coefficient of friction of the untreated material relative to the stainless steel was found to be 1.61. The coefficients of friction of the elastomers which were exposed to boron trifluoride under the conditions of Treatments A, B and C were found to be 1.25, 1.25 and 1.34 respectively.

Example IX

The following materials were compounded into an elastomeric formulation and subject to treatment with boron trifluoride under the same three varying sets of conditions as described in Example V.

| Component: | Parts by weight |
|---|---|
| Acrylonitrile - butadiene copolymer 30–34% acrylonitrile | 100 |
| Zinc oxide | 2.5 |
| Litharge | 1.3 |
| Stearic acid | 1 |
| Sulfur | 1 |
| Low temperature reaction product of diphenylamine and acetone | 1.5 |
| Fast extruding furnace black | 30 |
| Semireinforcing furnace black | 15 |
| Fine thermal black | 20 |
| Triglycol ester of vegetable oil fatty acid | 4 |
| Dibenzyl sebacate | 4 |
| Tetramethyl thiuram monosulfide | 0.6 |

Samples of treated and untreated elastomers were prepared for determination of the relative coefficients of friction as described above in Example I. The coefficients of friction of untreated elastomers relative to stainless steel surface was found to be 0.62. The coefficients of friction of the elastomers treated with gaseous boron trifluoride in accordance with the conditions of Treatments A, B and C were found to be 0.40, 0.45, and 0.36 respectively.

In general, it was obvious that the coefficient of friction of the treated samples was reduced by about one half or more by the process of this invention. The principal exception to this were the treated polychloroprene samples in which a substantial reduction of the coefficients of friction was obtained although not as great as with the other elastomers. Although it is apparent that the surface of the boron trifluoride treated elastomer undergoes a change and probably a molecular change, the nature of this change is not definitely known since a chemical reaction between the elastomer surface molecules and the boron trifluoride is not to be expected by any known mechanism.

In general, the process of this invention is effective on virtually any elastomer of the butadiene type and no surface pretreatment is required. Improved results however are obtained when the elastomer surfaces are clean. In general, to obtain such improved results it is only necessary to clean the elastomer surface with a hot detergent solution. In general, it is desirable to rinse or wash the sample after the boron trifluoride treatment with acetone or with a dilute potassium hydroxide solution to remove residual boron trifluoride although this is not essential.

As previously stated, the process may be practiced successfully as low as −30° C. up to the thermal degradation temperature of the elastomer. It is not desirable to practice the process in the vicinity of the thermal degradation temperature thereof because of the adverse affects of the heat on the other physical properties of the elastomer. It will be appreciated of course, that the temperature at which a substantial thermal degradation of the polymer occurs to affect its properties adversely will vary with the various elastomers. As a practical matter little advantage is gained by practicing the process in excess of about 150° C. As previously indicated, satisfactory products having a markedly reduced coefficient of friction are obtained when the elastomer is subjected to gaseous boron trifluoride for about 15 minutes when elevated pressures and temperatures are used as previously described. Although substantial reduction in the coefficient of friction is obtained in a few seconds of time, no significant advantage is obtained when the duration of the treatment exceeds about 24 hours.

The process of this invention is operative with both cured and uncured elastomers as well as filled and unfilled elastomers. In some instances it is desirable to treat uncured elastomers by means of the process of this invention while employing suitable temperatures to effect a simultaneous cure of the elastomer. In general, it is preferable to employ boron trifluoride in its gaseous state in the process, although it will be readily apparent to those skilled in the art that the boron trifluoride may be applied to the elastomer surface in a suitable solvent solution which would not have a solvent or other adverse effect on the elastomer.

While the invention has been described in terms of a preferred embodiment it is to be understood that the invention is not limited thereby except as defined by the following claims.

I claim:

1. The process which comprises directly contacting the surface of a solid elastomeric article taken from the class consisting of natural rubber, synthetic polyisoprene, polybutadiene, butadiene-acrylonitrile, butadiene-styrene-acrylonitrile, butadiene-styrene and polychloroprene, with boron trifluoride, thereby substantially reducing the coefficient of friction of the elastomer surface without substantial change in the physical form thereof.

2. The process of claim 1 wherein boron trifluoride is gaseous.

3. The elastomer in accordance with the process of claim 1.

4. The process of reducing the coefficient of friction of the class of polymers in the form of a solid elastomeric article taken from the group consisting of natural rubber, polyisoprene, polybutadiene, butadiene-acrylonitrile, butadiene-styrene-acrylonitrile, butadiene-styrene and polychloroprene, without previously altering the chemical structure of the elastomer surface to change the physical form thereof which comprises contacting the elastomer surface with gaseous boron trifluoride under substantially anhydrous conditions at temperatures between about $-30°$ C. and the thermal degradation temperature of the elastomer.

5. A process as in claim 4 wherein said elastomer surface is contacted with gaseous boron trifluoride for at least about fifteen minutes.

6. An elastomer in accordance with the process of claim 4.

References Cited

UNITED STATES PATENTS

| 2,983,626 | 5/1961 | Schneider | 117—106 |
| 3,081,288 | 3/1963 | Edmonds | 260—93.7 |
| 3,340,245 | 9/1967 | Oser | 260—94.9 |
| 3,345,348 | 10/1967 | Tennenhouse | 260—83.3 |

JOSEPH L. SCHAFER, *Primary Examiner.*

J. C. HAIGHT, *Assistant Examiner.*

U.S. Cl. X.R.

260—85.1, 92.3, 768, 816, 770